US012656863B1

(12) United States Patent (10) Patent No.: US 12,656,863 B1
Carlsson et al. (45) Date of Patent: Jun. 16, 2026

(54) HYBRID HEADS-UP DISPLAY FOR PRESENTING VIRTUAL CONTENT OUTSIDE BOUNDARIES

(71) Applicant: Distance Technologies Oy, Helsinki (FI)

(72) Inventors: Thomas Carlsson, Vantaa (FI); Mikko Strandborg, Hangonkylä (FI); Petri Savolainen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/985,506

(22) Filed: Dec. 18, 2024

(51) Int. Cl.
*G06F 3/01* (2006.01)
*G02B 27/01* (2006.01)
*G09G 3/00* (2006.01)

(52) U.S. Cl.
CPC ......... *G06F 3/013* (2013.01); *G02B 27/0101* (2013.01); *G02B 27/0179* (2013.01); *G09G 3/001* (2013.01); *G02B 2027/014* (2013.01); *G02B 2027/0187* (2013.01); *G09G 2340/0435* (2013.01); *G09G 2354/00* (2013.01); *G09G 2380/10* (2013.01)

(58) Field of Classification Search
CPC . G06F 3/013; G02B 27/0101; G02B 27/0178; G02B 2027/014; G02B 2027/0187; G09G 3/001; G09G 2340/0435; G09G 2354/00; G09G 2380/10
See application file for complete search history.

(56) References Cited

U.S. PATENT DOCUMENTS

| | | | | |
|---|---|---|---|---|
| 9,244,280 | B1 | 1/2016 | Tiana et al. | |
| 11,281,290 | B2 | 3/2022 | Eiden et al. | |
| 12,025,798 | B1 * | 7/2024 | Dehkordi | B60K 35/00 |
| 2018/0157037 | A1 * | 6/2018 | Kasazumi | B60K 37/20 |
| 2019/0178669 | A1 * | 6/2019 | Lee | G01C 21/365 |
| 2021/0165220 | A1 * | 6/2021 | Nakada | B60K 35/233 |

OTHER PUBLICATIONS

European Patent Office, Extended European Search Report, App No. 25214160.1-1001, Mailed on Apr. 15, 2026, 8 Pages.

* cited by examiner

*Primary Examiner* — Brent D Castiaux
(74) *Attorney, Agent, or Firm* — Ziegler IP Law Group, LLC.

(57) ABSTRACT

A relative location of each eye of user(s) with respect to an optical combiner is determined. A position and an orientation of a first region of a light-emitting component of a light field display unit is determined. A first region of a given light field image (LFI) is generated, wherein the first region of the light-emitting component displays the first region of the given LFI. A second region of the given LFI is generated, wherein the second region of the light-emitting component displays the second region of the given LFI. When the given LFI is displayed, wherein a first part of a synthetic light field corresponding to the first region of the given LFI is directed towards the user(s), whilst a second part of the synthetic light field corresponding to the second region of the given LFI is directed towards the optical combiner.

20 Claims, 3 Drawing Sheets

HYBRID HEADS-UP DISPLAY FOR PRESENTING VIRTUAL CONTENT OUTSIDE BOUNDARIES

TECHNICAL FIELD

The present disclosure relates to systems incorporating hybrid heads-up displays for presenting virtual content outside boundaries. The present disclosure also relates to methods incorporating hybrid heads-up displays for presenting virtual content outside boundaries.

BACKGROUND

Heads-up displays (HUDs) have become a pivotal technology in the realm of vehicle user interfaces, allowing visual information to be presented to users without diverting their attention from their primary tasks, for example, such as driving a vehicle. Typically, HUDs are embedded into transparent surfaces, for example, such as windshields of vehicles, thereby enabling seamless integration of a navigational cue, a speed indicator, a fuel indicator, and the like, within a real-world environment in which the vehicles are present.

However, existing HUD implementations are associated with several limitations. Firstly, a visibility of augmented-reality (AR) information is restricted to be displayed via a windshield of a vehicle or any other transparent surface. This often results in important visual data being partially cropped or displayed outside the boundaries of the HUD, which prevents a user from fully viewing critical visual information, potentially compromising the user's awareness and safety in the vehicle. Secondly, the boundaries of the HUD are naturally constrained by an aerodynamic design of the vehicle, thereby restricting an overall display area for displaying visual information to the user. This often results in visibility gaps when displaying crucial visual information, particularly at a periphery of the HUD, thereby resulting in incomplete information being displayed to the user. Thirdly, the hardware of the HUD itself introduces physical limitations for displaying the AR information to the user, because a non-transparent component of the HUD (such as a display module of the HUD) restricts an actual projection area within a field of view of the user.

Therefore, in light of the foregoing discussion, there exists a need to overcome the aforementioned drawbacks.

SUMMARY

The present disclosure seeks to provide a system and a method which facilitate in presenting virtual content outside boundaries of an optical combiner, in real time or near-real time. The aim of the present disclosure is achieved by a system and a method which incorporate a hybrid heads-up display (HUD) for presenting virtual content outside the boundaries of the optical combiner, by way of directing a first part of a synthetic light field corresponding to a first region of a given light field image towards user(s), whilst directing a second part of the synthetic light field corresponding to a second region of a given light field image towards the optical combiner, as defined in the appended independent claims to which reference is made to. Advantageous features are set out in the appended dependent claims.

Throughout the description and claims of this specification, the words "comprise", "include", "have", and "contain" and variations of these words, for example, "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
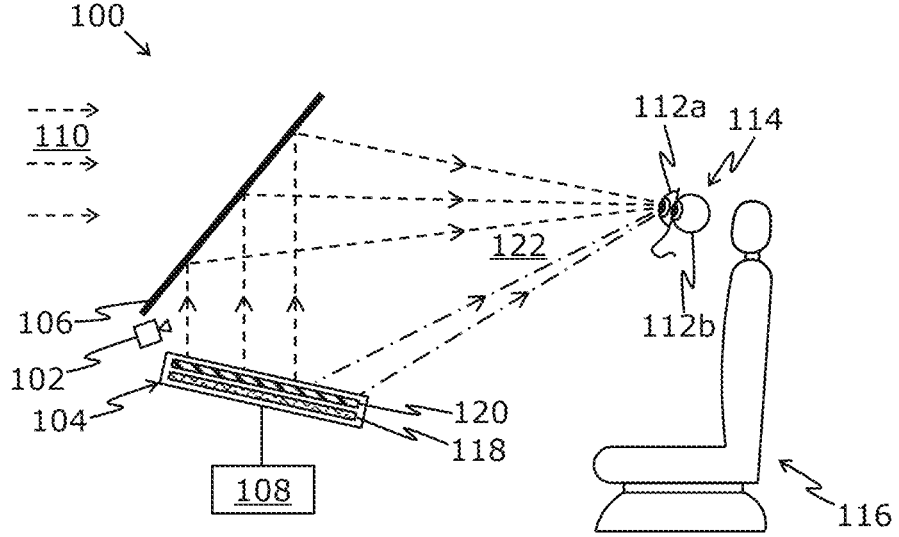
FIGS. 1A, 1B, and 1C illustrate simplified example implementations of a system incorporating a hybrid heads-up display for presenting virtual content outside boundaries, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

tracking means;

a light field display unit;

an optical combiner; and at least one processor configured to:

determine a relative location of a first eye and a second eye of at least one user with respect to the optical combiner, by utilising the tracking means;

determine a position and an orientation of at least a first region of a light-emitting component of the light field display unit with respect to the first eye and the second eye of the at least one user, by utilising the tracking means;

generate a first region of a given light field image to be displayed via the light field display unit, based on the position and the orientation of at least the first region of the light-emitting component of the light field display unit with respect to the first eye and the second eye of the at least one user, wherein the first region of the light-emitting component is to be employed to display the first region of the given light field image;

generate a second region of the given light field image, based on the relative location of the first eye and the second eye of the at least one user with respect to the optical combiner, and a position and an orientation of a second region of the light-emitting component of the light field display unit with respect to the optical combiner, wherein the second region of the light-emitting component is to be employed to display the second region of the given light field image, the second region being different from the first region; and display the given light field image via the light field display unit to produce a synthetic light field, wherein a first part of the synthetic light field corresponding to the first region of the given light field image is directed towards the at least one user, whilst a second part of the synthetic light field corresponding to the second region of the given light field image is directed towards the optical combiner, wherein the optical combiner is employed to reflect respective sub-parts of the second part of the synthetic light field towards the first eye and the second eye of the at least one user, whilst optically combining a real-world light field with the respective sub-parts of the second part of the synthetic light field.

In a second aspect, an embodiment of the present disclosure provides a method comprising:

determining a relative location of a first eye and a second eye of at least one user with respect to an optical combiner, by utilising tracking means;

determining a position and an orientation of at least a first region of a light-emitting component of a light field display unit with respect to the first eye and the second eye of the at least one user, by utilising the tracking means;

generating a first region of a given light field image to be displayed via the light field display unit, based on the position and the orientation of at least the first region of the light-emitting component of the light field display unit with respect to the first eye and the second eye of the at least one user, wherein the first region of the light-emitting component is to be employed to display the first region of the given light field image;

generating a second region of the given light field image, based on the relative location of the first eye and the second eye of the at least one user with respect to the optical combiner, and a position and an orientation of a second region of the light-emitting component of the light field display unit with respect to the optical combiner, wherein the second region of the light-emitting component is to be employed to display the second region of the given light field image, the second region being different from the first region; and displaying the given light field image via the light field display unit to produce a synthetic light field, wherein a first part of the synthetic light field corresponding to the first region of the given light field image is directed towards the at least one user, whilst a second part of the synthetic light field corresponding to the second region of the given light field image is directed towards the optical combiner, wherein the optical combiner is employed to reflect respective sub-parts of the second part of the synthetic light field towards the first eye and the second eye of the at least one user, whilst optically combining a real-world light field with the respective sub-parts of the second part of the synthetic light field.

The present disclosure provides the aforementioned system and the aforementioned method which facilitate in presenting virtual content outside boundaries of the optical combiner, by way of directing the first part of the synthetic light field corresponding to the first region of the given light field image towards the at least one user, whilst directing the second part of the synthetic light field corresponding to the second region of the given light field image towards the optical combiner from which it is reflected towards the at least one user, in real time or near-real time. Herein, the first region of the light-emitting component is employed for presenting virtual content (corresponding to the first part of the synthetic light field) to the at least one user for direct viewing (i.e., without reflecting said first part off the optical combiner), while the second region of the light-emitting component is employed for presenting virtual content (corresponding to the second part of the synthetic light field) to the at least one user for indirect viewing (i.e., upon reflecting said second part off the optical combiner). The first part of the synthetic light field spans a first part of a viewing zone of the system, while the second part of the synthetic light field spans a second part of the viewing zone of the system. The first part of the viewing zone and the second part of the viewing zone could overlap partially to enable a seamless transition therebetween. Therefore, when the given light field image is displayed via the light field display unit in the aforesaid manner, an effective viewing area for presenting the virtual content to the at least one user is significantly increased. In this way, critical information provided by the virtual content can be displayed beyond boundaries of (namely, physical constraints of) the optical combiner without any cropping, and without employing separate display units. This is because the system utilises both direct synthetic light field (namely, the first part of the synthetic light field that is directed towards the at least one user) and reflected synthetic light field (namely, the second part of the synthetic light field that is reflected off the optical combiner towards the at least one user) for enabling display of the virtual content to extend beyond the boundaries of the optical combiner. Advantageously, this facilitates in providing a comprehensive visual experience to the at least one user for improved situational awareness and safety in a vehicle when the system is implemented in the vehicle, and also eliminates a need for the at least one user to shift his/her gaze between a road and separate display devices in the vehicle.

Moreover, in this way, an existing heads-up display (HUD) can be repurposed to be implemented as a hybrid HUD of the present disclosure, wherein the hybrid HUD is capable of displaying the virtual content to the at least one user by way of directing the first part of the synthetic light field directly towards the at least one user (without requiring reflection via the optical combiner), whilst displaying the virtual content to the at least one user by way of directing the second part of the synthetic light field towards the at least one user upon reflecting off the optical combiner. This capability of the hybrid HUD is particularly valuable in critical applications, such as defence, search and rescue operations, where the virtual content presented via a lower part of a viewing zone of the hybrid HUD that faces the at least one user can play an essential role.

While the system and the method are well-suited for implementation in an HUD, it is important to note that their application is not limited to HUDs alone. They can also be adapted for use in other types of display systems. Examples of such display systems include, but are not limited to, augmented-reality (AR) glasses, mixed-reality (MR) headsets, wearable displays (for example, such as smart helmets or smart bands), and automotive displays (for example, such as rear-view mirror displays). The system and the method are simple, robust, fast, reliable, support real-time presentation of the virtual content outside the boundaries, and can be implemented with ease.

For illustration purposes, there will now be described how the system and the method work to achieve the aforementioned technical benefits.

The tracking means is controlled to track a location of the first eye and the second eye of the at least one user, in real time or near-real time. When the system is implemented in the vehicle, the optical combiner is typically fixedly arranged in the vehicle, a location of the optical combiner is pre-known to the at least one processor. Thus, the relative location of the first eye and the second eye of the at least one user with respect to the optical combiner can be determined, for example, using a coordinate geometry-based technique. When the location of the first eye and the second eye of the at least one user changes (for example, when the at least one user moves his eyes and/or turns his/her head), the relative location of the first eye and the second eye of the at least one user with respect to the optical combiner also changes accordingly. The relative location of the first eye and the second eye of the at least one user with respect to the optical combiner is determined because it is utilised (namely, taken into account) when generating the second region of the given light field image whose corresponding part of the synthetic light field (namely, the second part of the synthetic light field) is to be directed towards the optical combiner, when displaying the second region of the given light field image. Optionally, when the system is implemented in the vehicle, the light field display unit is arranged on a dashboard of the vehicle, and the optical combiner is implemented using a transparent portion of a windshield of the vehicle. It will be appreciated that there may be some cases where the light field display unit may be arranged on a roof of the vehicle, but not on the dashboard of the vehicle. Similarly, the optical combiner may be implemented using a pull-down reflector or similar, but not using the windshield of the vehicle. The term "vehicle" encompasses at least one of: a land vehicle (for example, such as a car, a truck and the like), an aircraft, a watercraft (for example, such as a boat). The car could be a convertible car or a hardtop car. In an example, when the system is implemented in the aircraft, the light field display unit may be roof-mounted, and may be employed to display locations of other aircrafts that are in a vicinity of said aircraft.

When the system is implemented in the vehicle, a position and an orientation of at least the first region of the light-emitting component can be pre-known to the at least one processor, because the light field display unit is typically fixedly arranged in the vehicle. The tracking means is also controlled to track a position and an orientation of the first eye and the second eye of the at least one user, in real time or near-real time. Thus, the position and the orientation of at least the first region of the light-emitting component with respect to the first eye and the second eye of the at least one user can be determined, for example, using the coordinate geometry-based technique. When the position and the orientation of the first eye and the second eye change (for example, when the at least one user moves his eyes and/or turns his/her head), the position and the orientation of at least the first region of the light-emitting component with respect to the first eye and the second eye change also change accordingly. The position and the orientation of at least the first region of the light-emitting component with respect to the first eye and the second eye are determined because they are utilised (namely, are taken into account) when generating the first region of the given light field image whose corresponding part of the synthetic light field (namely, the first part of the synthetic light field) is to be directed towards the first eye and the second eye of the at least one user, when displaying the first region of the given light field image.

Throughout the present disclosure, the term "first region" of the given light field image refers to a region of the given light field image whose corresponding part of the synthetic light field (namely, the first part of the synthetic light field) is to be directed towards (the eyes of) the at least one user, without being reflected from the optical combiner.

Throughout the present disclosure, the term "second region" of the given light field image refers to a region of the given light field image whose corresponding part of the synthetic light field (namely, the second part of the synthetic light field) is to be directed towards the optical combiner, and the optical combiner reflects said corresponding part of the synthetic light field towards (the eyes of) the at least one user.

Generating the first region of the given light field image depends on the position and the orientation of at least the first region of the light-emitting component with respect to the first eye and the second eye of the at least one user. In other words, at least the first region of the given light field image is generated by considering a tilt of at least the first region of the light-emitting component with respect to eyes of the at least one user and a position of an area of at least the first region of the light-emitting component with respect to eyes of the at least one user employed for directing the first part of the synthetic light field towards the at least one user.

A position and an orientation of the second region of the light-emitting component as well as a position and an orientation of the optical combiner can be pre-known to the at least one processor, because both the light field display unit and the optical combiner are typically fixedly arranged in the vehicle, in a case where the system is implemented in the vehicle. Thus, the position and the orientation of the second region of the light-emitting component with respect to the optical combiner can be determined, for example, using the coordinate geometry-based technique.

Generating the second region of the given light field image depends on the relative location of the first eye and the second eye of the at least one user with respect to the optical combiner, and the position and the orientation of the second region of the light-emitting component with respect to the optical combiner. In other words, the second region of the given light field image is generated by considering: (i) a tilt of the second region of the light-emitting component with respect to the optical combiner, (ii) a position of an area of the second region of the light-emitting component with respect to the optical combiner, said area being employed for directing the second part of the synthetic light field towards the optical combiner, and (iii) a location of the first eye and the second eye with respect to the optical combiner employed for reflecting the second part of the synthetic light field.

The first part of the given light field image is displayed via the first region of the light-emitting component by way of directing the first part of the synthetic light field towards the at least one user. Simultaneously, the second part of the given light field image is displayed via the second region of the light-emitting component by way of directing the second part of the synthetic light field towards the optical combiner.

It will be appreciated that the first part of the viewing zone of the system corresponds to the first part of the synthetic light field being directed towards the eyes of the at least one user (without being reflected off the optical combiner), while the second part of the viewing zone of the system corresponds to the second part of the synthetic light field being directed towards the eyes of the at least one user upon reflecting off the optical combiner. The first part of the viewing zone and the second part of the viewing zone could overlap partially to enable a seamless transition therebetween. Beneficially, due to this the effective viewing area for presenting the virtual content to the at least one user is significantly increased. It is noteworthy that the first part of the viewing zone of the system corresponds to the first region of the light-emitting component of the light field display unit (i.e., without any involvement of the optical combiner), whereas the second part of the viewing zone of the system corresponds to a combination of the second region of the light-emitting component and the optical combiner. It is also noteworthy that since the first region of the light-emitting component is employed for presenting the virtual content to the at least one user via direct viewing, the first part of the viewing zone of the system depends on the position and the orientation of the first region of the light-emitting component of the light field display unit. However, since the second region of the light-emitting component is employed for presenting the virtual content to the at least one user via indirect viewing (namely, via the optical combiner), the second part of the viewing zone of the system depends on the position and the orientation of the optical combiner.

The given light field image may be understood to be a two-dimensional (2D) image comprising a plurality of pixels, wherein a first subset of pixels from amongst the plurality of pixels is responsible for generating a first sub-part of the first part of the synthetic light field that corresponds to the first eye, and a second subset of pixels from amongst the plurality of pixels is responsible for generating a second sub-part of the first part of the synthetic light field that corresponds to the second eye. In addition to this, a third subset of pixels from amongst the plurality of pixels is responsible for generating a third sub-part of the second part of the synthetic light field that corresponds to the first eye, and a fourth subset of pixels from amongst the plurality of pixels is responsible for generating a fourth sub-part of the second part of the synthetic light field that corresponds to the second eye. It will be appreciated that the pixels belonging to the first subset are not arranged in a continuous manner across the given light field image; similarly, the pixels belonging to the second subset are not arranged in a continuous manner across the given light field image. In addition to this, the pixels belonging to the third subset are not arranged in a continuous manner across the given light field image; similarly, the pixels belonging to the fourth subset are not arranged in a continuous manner across the given light field image. Optionally, the pixels belonging to the first subset and the pixels belonging to the second subset are arranged in alternating vertical stripes across a horizontal field of view of the given light field image, wherein each vertical stripe comprises one or more scanlines of pixels. Additionally, optionally, the pixels belonging to the third subset and the pixels belonging to the fourth subset are arranged in alternating vertical stripes across a horizontal field of view of the given light field image, wherein each vertical stripe comprises one or more scanlines of pixels. This is because humans perceive depth mainly based on horizontal binocular parallax. In this way, the light field image would be considerably different as compared to a conventional 2D image that is displayed via conventional 2D displays, because a same light field image would comprise visual information corresponding to the first eye as well as the second eye of the at least one user.

It will be appreciated that when the first part of the synthetic light field is directed towards the at least one user, light emanating from the first region of the second region of the light-emitting component is directed towards the eyes of the at least one user (without being reflected off the optical combiner). In this way, the virtual content (or its part)

corresponding to the first region of the given light field image is perceived by the eyes of the at least one user. Additionally, when the respective sub-parts of the second part of the synthetic light field are reflected off the optical combiner, light emanating from a sub-region of the second region of the light-emitting component is directed towards the first eye and light emanating from another sub-region of the second region of the light-emitting component is directed towards the second eye. In this way, the virtual content (or its part) corresponding to the second region of the given light field image is perceived by the eyes of the at least one user. When the respective sub-parts of the second part of the synthetic light field are optically combined with the real-world light field, the virtual content is perceived by the eyes along with visual information pertaining to at least one real-world object present in a real-world environment where the system is implemented. Advantageously, this provides a result that is similar to displaying a combined view of a virtual image augmenting a real-world image to the at least one user. It is to be understood that the virtual content corresponding to the first part of the synthetic light field is perceived by the first eye and the second eye as a first virtual image and a second virtual image, respectively. Similarly, the virtual content corresponding to the second part of the synthetic light field is perceived by the first eye and the second eye as a third virtual image and a fourth virtual image, respectively. Beneficially, this enables the at least one user to perceive depth in virtual content being presented through such pairs of virtual images.

In an implementation of the system in a vehicle, the light field display unit may span across a flat, horizontal portion (namely, a top portion) of a dashboard of the vehicle (for example, such as a car), and thus most of the synthetic light field is directed towards the optical combiner and a very less part or no part of the synthetic light field is directed towards the at least one user, when the given light field image is displayed via the light field display unit. In such a case, an active optical element is employed such that the first part of the synthetic light field can be (purposely) re-directed towards the at least one user for direct viewing, even when the light field display unit spans across the flat, horizontal portion of the dashboard of the vehicle.

In this regard, optionally, the light field display unit further comprises an active optical element arranged on an optical path of the light-emitting component, wherein the at least one processor is configured to:

control a first region of the active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user.

Throughout the present disclosure, the term "active optical element" refers to an optical element that is controllable for actively directing (namely, steering) light emanating from a given region of the light-emitting component towards a given eye of a given user. It will be appreciated that the light emanating from the given region of the light-emitting component could be collimated light or near-collimated light. As the active optical element is in a close proximity of display layers of the light field display unit (similar to a parallax barrier), collimation of the light may not be strictly necessary.

Optionally, when controlling the first region of the active optical element, the first sub-part of the first part of the synthetic light field is re-directed towards the first eye of the at least one user, whilst the second sub-part of the first part of the synthetic light field is re-directed towards the second eye of the at least one user. Thus, in this way, the active optical element is employed to (purposely) re-direct the first part of the synthetic light field towards eyes of the at least one user for direct viewing, especially, in a case where the light field display unit spans across the flat, horizontal portion of the dashboard of the vehicle (as discussed earlier).

A technical benefit of employing the active optical element is that it allows for very precise control and re-direction of the light (emanating from the first region of the light-emitting component) towards the first eye and the second eye of the at least one user, irrespective of how the light field display unit is arranged (for example, in a case where it spans across the dashboard of the vehicle when the system is implemented in the vehicle). This potentially enables in displaying highly accurate and realistic virtual content (corresponding to the first part of the synthetic light field) to the at least one user. By dynamically controlling the active optical element, the light is directed in a manner that the eyes of the at least one user would perceive an autostereoscopic effect highly realistically and accurately when viewing the virtual content corresponding to the first part of the synthetic light field. This may also allow for producing the autostereoscopic effect even when the eyes of the at least one user are located relatively far (for example, more than 1 metre away) from the light field display unit.

Optionally, the active optical element is implemented as a liquid-crystal (LC) optical element. The LC optical element enables in directing light passing therethrough by adjusting a refractive index of an LC material in the LC optical element. In this regard, the refractive index of the LC material can be controlled electrically. Optionally, the LC optical element is implemented as at least one LC layer. In some implementations, the LC optical element could be implemented as two LC layers. In an example, the LC optical element may be implemented as a switchable LC shutter array. Electrically controlling the LC material to redirect light incident thereupon is well-known in the art. The technical benefit of implementing the LC optical element is that the LC material in the LC optical element could be easily and conveniently controlled (electrically) to direct the light very precisely, irrespective of any relative location of the eyes of the at least one user.

It is noteworthy that the active optical element can only be employed for the first region of the light-emitting component of the light field display unit because in said typical implementation, the light emanating from the second region of the light-emitting component of the light field display unit anyway incident upon the optical combiner, for enabling the second part of the synthetic light field to reflect off the optical combiner. Thus, the active optical element need not necessarily be employed for the second region of the light-emitting component. However, such a necessity depends on a shape of the light-emitting component, which dictates the position and the orientation of the second region of the light-emitting component with respect to the optical combiner.

It will be appreciated that in some cases where the system is implemented in the vehicle, the first region of the light-emitting component of the light field display unit could span across a curved portion of the dashboard of the vehicle that faces the at least one user, wherein said curved portion of the dashboard beneficially facilitates in directing the first part of the synthetic light field towards the at least one user, without necessarily employing the active optical element as discussed earlier. Moreover, when the first region of the light-emitting component spans across the curved portion of the dashboard, a relatively large viewing zone can be provided to the at least one user, as compared to a case where the first region of the light-emitting component spans across the flat, horizontal portion of the dashboard. Optionally, when the first region of the light-emitting component spans across the curved portion of the dashboard, the at least one processor is configured to generate at least the first region of the given light field image, based further on a curvature of the first region of the light-emitting component, irrespective of whether the active optical element is employed or not employed. In such a case, the first region of the given light field image is distortion corrected to compensate for geometric aberrations that may arise due to the curvature.

Optionally, the light field display unit further comprises an active optical element arranged on an optical path of the light-emitting component, wherein the at least one processor is configured to:

control a first region of the active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user; and control a second region of the active optical element that corresponds to the second region of the light-emitting component of the light field display unit, based on the relative location of the first eye and the second eye of the at least one user with respect to the optical combiner, and the position and the orientation of the second region of the light-emitting component with respect to the optical combiner, to re-direct the respective sub-parts of the second part of the synthetic light field corresponding to the second region of the given light field image towards the optical combiner.

In this regard, the active optical element is employed for re-directing both the first part of the synthetic light field (that is to be directed towards the at least one user, without being reflected from the optical combiner) and the second part of the synthetic light field (that is to be reflected off the optical combiner). Optionally, when controlling the first region of the active optical element, the first sub-part of the first part of the synthetic light field is re-directed towards the first eye of the at least one user, whilst the second sub-part of the first part of the synthetic light field is re-directed towards the second eye of the at least one user. Simultaneously, optionally, when controlling the second region of the active optical element, the third sub-part and the fourth sub-part of the second part of the synthetic light field are re-directed towards the optical combiner.

A technical benefit of employing the active optical element in the aforesaid manner is that it allows for very precise control and re-direction of the light emanating from the first region of the light-emitting component (namely, the respective sub-parts of the first part of the synthetic light field) towards the first eye and the second eye of the at least one user, and the light emanating from the second region of the light-emitting component (namely, the respective sub-parts of the second part of the synthetic light field) towards the optical combiner. This potentially enables in displaying highly accurate and realistic virtual content presented by the first part as well as the second part of the synthetic light field, to the eyes of the at least one user.

Optionally, the light field display unit further comprises a multiscopic optical element arranged on an optical path of the light-emitting component, wherein the at least one processor is configured to control the multiscopic optical element for directing the first part of the synthetic light field towards the at least one user, whilst directing the second part of the synthetic light field towards the optical combiner. In a typical implementation of the system, the multiscopic optical element is preferably employed for directing parts of the synthetic light field as mentioned hereinabove, irrespective of whether the active optical element is employed or not employed for re-directing the parts of the synthetic light field. However, in an implementation, when both the multiscopic optical element and the active optical element are employed, controlling and re-direction of the light emanating from the first region and the second region of the light-emitting component can be performed in an exceptionally accurate and precise manner. Herein, the term "multiscopic optical element" refers to a specialised optical element that is capable of directing light emanating from the light-emitting component in different directions simultaneously. This allows the multiscopic optical element to present a multiscopic view to the at least one user without any need for her/him to wear 3D glasses. Optionally, the multiscopic optical element is implemented as any one of: a parallax barrier, a lenticular array. Accordingly, the light field display unit is implemented.

Optionally, the light field display unit further comprises an active optical element arranged on an optical path of the light-emitting component, wherein the at least one processor is configured to:

detect when virtual content is to be presented directly via the light field display unit only; and when it is detected that the virtual content is to be presented directly via the light field display unit only, generate another light field image to be displayed via the light field display unit, based on a position and an orientation of at least a region of the light-emitting component of the light field display unit with respect to the first eye and the second eye of the at least one user, wherein at least said region of the light-emitting component is to be employed to present the virtual content;

display the another light field image via the light field display unit to produce another synthetic light field; and control the active optical element, based on the position and the orientation of at least said region of the light-emitting component with respect to the first eye and the second eye of the at least one user, to re-direct respective parts of the another synthetic light field towards the first eye and the second eye of the at least one user.

In this regard, when the virtual content is to be presented directly via the light field display unit only, the active optical element is employed for selectively re-directing the respective parts of the another synthetic light field towards the at least one user, without being reflected from the optical combiner. It will be appreciated that for controlling the active optical element, a region of the active optical element that corresponds to at least said region of the light-emitting component can be controlled accordingly, or an entirety of the active optical element can also be controlled accordingly. Optionally, when controlling the active optical element, a first part of the another synthetic light field is re-directed towards the first eye of the at least one user, whilst a second part of the another synthetic light field is re-directed towards the second eye of the at least one user. It may be understood that when the virtual content is to be presented directly via the light field display unit only, the virtual content comprises the at least one virtual object that is to be presented in the first part of the viewing zone of the system that lies below the second part of the viewing zone of the system. Information pertaining to the viewing zone has been already discussed earlier.

It will be appreciated that the another light field image is generated in a similar manner as the first region of the given light field image was generated, as explained earlier in detail. Moreover, the another light field image is displayed via the light field display unit to produce another synthetic light field in a similar manner as the given light field image was displayed via the light field display unit to produce the synthetic light field, as explained earlier. Furthermore, since the virtual content (to be presented via at least said region of the light-emitting component) is generated by the at least one processor itself, it can be accurately known when the virtual content is to be presented directly via the light field display unit only.

A technical benefit of employing the active optical element in the aforesaid manner is that it allows for very precise control and re-direction of the light (emanating from at least said region of the light-emitting component) towards the first eye and the second eye of the at least one user. This potentially enables in displaying highly accurate and realistic virtual content presented by the another synthetic light field, to the eyes of the at least one user, in a same manner as explained earlier.

Optionally, the light field display unit further comprises an active optical element arranged on an optical path of the light-emitting component, wherein the at least one processor is configured to:

detect when virtual content is to be presented via the optical combiner only; and when it is detected that the virtual content is to be presented via the optical combiner only, generate yet another light field image to be displayed via the light field display unit, based on the relative location of the first eye and the second eye of the at least one user with respect to the optical combiner, and a position and an orientation of at least a region of the light-emitting component of the light field display unit with respect to the optical combiner, wherein at least said region of the light-emitting component is to be employed to present the virtual content;

display the yet another light field image via the light field display unit to produce yet another synthetic light field; and control the active optical element, based on the relative location of the first eye and the second eye of the at least one user with respect to the optical combiner, and the position and the orientation of at least said region of the light-emitting component with respect to the optical combiner, to re-direct the yet another synthetic light field towards the optical combiner, wherein the optical combiner is employed to reflect respective parts of the yet another synthetic light field towards the first eye and the second eye of the at least one user, whilst optically combining the real-world light field with the respective parts of the yet another synthetic light field.

In this regard, when the virtual content is to be presented to the at least one user via the optical combiner, the active optical element is employed for selectively re-directing the respective parts of the yet another synthetic light field towards the optical combiner, so that the respective parts of the yet another synthetic light field can be directed towards the eyes of the at least one user upon reflecting off the optical combiner. It will be appreciated that for controlling the active optical element, a region of the active optical element that corresponds to at least said region of the light-emitting component can be controlled accordingly, or an entirety of the active optical element can also be controlled accordingly. It may be understood that when the virtual content is to be presented directly via the optical combiner only, the virtual content comprises the at least one virtual object that is to be presented in the second part of the viewing zone of the system, the second part lying above the first part of the viewing zone of the system.

It will be appreciated that the yet another light field image is generated in a similar manner as the second region of the given light field image was generated, as explained earlier in detail. Moreover, the yet another light field image is displayed via the light field display unit to produce another synthetic light field in a similar manner as the given light field image was displayed via the light field display unit to produce the synthetic light field, as explained earlier in detail. Furthermore, since the virtual content (to be presented via at least said region of the light-emitting component) is generated by the at least one processor itself, it can be accurately known when the virtual content is to be presented via the optical combiner only.

A technical benefit of employing the active optical element in the aforesaid manner is that it allows for very precise control and re-direction of the light (emanating from at least said region of the light-emitting component) towards the optical combiner. This potentially enables in displaying highly accurate and realistic virtual content presented by the yet another synthetic light field upon reflecting off the optical combiner, to the eyes of the at least one user.

Optionally, the light field display unit further comprises an active optical element arranged on an optical path of the light-emitting component, wherein the at least one processor is configured to:

generate a first light field image to be displayed via the light field display unit, based on a position and an orientation of the light-emitting component of the light field display unit with respect to the first eye and the second eye of the at least one user;

generate a second light field image to be displayed via the light field display unit, based on the relative location of the first eye and the second eye of the at least one user with respect to the optical combiner, and a position and an orientation of the light-emitting component of the light field display unit with respect to the optical combiner;

display the first light field image and the second light field image, via the light field display unit, to produce a first synthetic light field and a second synthetic light field, respectively, wherein the first light field image and the second light field image are displayed by employing temporal multiplexing;

when displaying the first light field image, control the active optical element, based on the position and the orientation of the light-emitting component with respect to the first eye and the second eye of the at least one user, to re-direct respective parts of the first synthetic light field towards the first eye and the second eye of the at least one user; and when displaying the second light field image, control the active optical element, based on the relative location of the first eye and the second eye of the at least one user with respect to the optical combiner, and the position and the orientation of the light-emitting component with respect to the optical combiner, to re-direct the second synthetic light field towards the optical combiner, wherein the optical combiner is employed to reflect respective parts of the second synthetic light field towards the first eye and the second eye of the at least one user, whilst optically combining the real-world light field with the respective parts of the second synthetic light field.

In this regard, the temporal multiplexing is employed by the at least one processor when displaying the first light field image and the second light field image, wherein the first light field image and the second light field image are displayed in alternating time intervals via the (same) light field display unit. The temporal multiplexing beneficially allows to rapidly switch between displaying each light field image in a sequence, fast enough that the human eye perceives both the first light field image and the second light field image as being displayed simultaneously. In other words, the light field display unit would alternate between displaying the first light field image (by producing the first synthetic light field) and the second light field image (by producing the second synthetic light field) in quick succession, often within milliseconds. Such a switching rate needs to be fast enough that persistence of vision gives an impression of continuous, simultaneous displaying of the aforesaid light field images. This may allow each light field image to contribute to a combined visual effect without needing to have two separate display units. This significantly improves an overall viewing experience of the at least one user.

It is noteworthy that at a given time instant, both the first region and the second region of the light-emitting component of the light field display unit are (namely, an entirety of the light-emitting component of the light field display unit is) employed for presenting the virtual content (corresponding to the first synthetic light field) to the at least one user for direct viewing. However, at another given time instant, both the first region and the second region of the light-emitting component of the light field display unit are employed for presenting the virtual content (corresponding to the second synthetic light field) to the at least one user for indirect viewing (i.e., via the optical combiner). Due to the temporal multiplexing, the virtual content is presented to the at least one user for direct viewing and indirect viewing, in an alternating manner. It will be appreciated that in both of the aforesaid cases, an entirety of the viewing zone of the system is visible to the at least one user. It is to be understood that the virtual content corresponding to the first synthetic light field is perceived by the first eye and the second eye as a first virtual image and a second virtual image, respectively. Similarly, the virtual content corresponding to the second synthetic light field is perceived by the first eye and the second eye as a third virtual image and a fourth virtual image, respectively. Beneficially, this enables the at least one user to perceive depth in virtual content being presented through such pairs of virtual images.

It will be appreciated that the first light field image is generated in a similar manner as the first region of the given light field image was generated, as explained earlier in detail. Similarly, the second light field image is generated in a similar manner as the second region of the given light field image was generated, as explained earlier in detail. A technical benefit of employing the active optical element in the aforesaid manner is that it allows for very precise control and re-direction of the light emanating from the first region of the light-emitting component towards the first eye and the second eye of the at least one user, and the light emanating from the second region of the light-emitting component towards the optical combiner. This potentially enables in displaying highly accurate and realistic virtual images (namely, the virtual content presented by the first part as well as the second part of the synthetic light field) to the eyes of the at least one user.

For illustration purposes, there will now be described how various components of the aforementioned system can be implemented.

The at least one processor controls an overall operation of the system. The at least one processor is communicably coupled to at least the tracking means and the light field display unit. In some implementations, the at least one processor is implemented as a processor of the light field display unit. In other implementations, the at least one processor is implemented as a processor of a computing device that is communicably coupled to the light field display unit. Examples of the computing device include, but are not limited to, a laptop, a tablet, a phablet, and a smartphone. In yet other implementations, the at least one processor is implemented as a cloud server (namely, a remote server) that provides a cloud computing service.

Throughout the present disclosure, the term "tracking means" refers to a specialised equipment for detecting and/or following at least a location of a given eye of the at least one user. The given eye encompasses the first eye and the second eye. The first eye could be one of a left eye and a right eye of the at least one user, whereas the second eye could be another of the left eye and the right eye. Optionally, the tracking means is implemented as at least one tracking camera. Optionally, the at least one tracking camera comprises at least one of: at least one visible-light camera, at least one IR camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Optionally, the at least one tracking camera further comprises at least one depth camera. Examples of the at least one depth camera include, but are not limited to, a Time-of-Flight (ToF) camera, a light detection and ranging (Li-DAR) camera, a Red-Green-Blue-Depth (RGB-D) camera, a laser rangefinder, a stereo camera, a plenoptic camera, a ranging camera, a Sound Navigation and Ranging (SONAR) camera. All the aforesaid types of cameras are well-known in the art. It will be appreciated that any combination of various different types of cameras (for example, such as the at least one visible-light camera, the at least one IR camera and the at least one depth camera) may be utilised in the tracking means. When different types of images captured by the various different types of cameras are utilised, at least the location of the given eye of the at least one user can be determined accurately for tracking purposes, as results obtained from one type of image can be used to refine results obtained from another type of image. The different types of images may be at least one of: visible-light images, IR images, depth images.

It will be appreciated that the at least one tracking camera is arranged to face the at least one user, to facilitate tracking of at least the location of the given eye of the at least one user. Optionally, said location is represented in a given coordinate space. As an example, the given coordinate space may be a Cartesian coordinate space. As an example, the given coordinate space may be a Cartesian coordinate space. It will be appreciated that the tracking means tracks both eyes of the at least one user with a significantly high accuracy and precision, such that an error in determining the relative location may, for example, be minimised to within a tolerance range of approximately (+/−) 8 millimetres.

It will also be appreciated that irrespective of where the at least one tracking camera is arranged, a relative location of the at least one tracking camera with respect to the optical combiner is fixed, and is pre-known to the at least one processor. Optionally, in this regard, when the tracking means are utilised to detect and/or follow the location of each eye of the at least one user, a location of each eye with respect to the at least one tracking camera is accurately known. Thus, the relative location of each eye of the at least one user with respect to the optical combiner can be determined, based on the relative location of the at least one tracking camera with respect to the optical combiner, and the location of each eye with respect to the at least one tracking camera. Optionally, the relative location of the first eye and the second eye of the at least one user is represented in the given coordinate space.

Throughout the present disclosure, the term "light field display unit" refers to a specialised equipment that is capable of producing the synthetic light field. In other words, the light field display unit is utilised to display the given light field image (which may be generated by the at least one processor) to produce the synthetic light field presenting virtual content at a given resolution. Optionally, the light field display unit is implemented in a form of any one of: a hogel-based light field display unit, a lenticular array-based light field display unit, a parallax barrier-based light field display unit. All the aforementioned forms of light field display units are well-known in the art.

Throughout the present disclosure, the term "light-emitting component" refers to a component of the light field display unit that emits light. It is to be understood that said light is emitted corresponding to a plurality of photo-emitting cells of the light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. As an example, in case of an LCD, the light field display unit comprises a backlight and an LCD panel, and the light-emitting component is the backlight, wherein the backlight and the LCD panel are used in conjunction to produce intensities of light corresponding to the plurality of photo-emitting cells. In such a case, the plurality of photo-emitting cells are implemented as a combination of the backlight and LC cells in the LCD panel. As another example, in case of a micro-LED-based display, the light-emitting component comprises an array of micro LEDs, wherein the plurality of photo-emitting cells are implemented as the micro-LEDs of said array. Optionally, the light field display unit comprises a display with a backlight (for example, such as an LCD or similar), and the light-emitting component is the backlight. Alternatively, optionally, the light field display unit comprises a display without any backlight (for example, an OLED display or similar), and the light-emitting component is the display.

Throughout the present disclosure, the term "optical combiner" refers to a specialised equipment that is capable of at least reflecting a corresponding sub-part of the second part of the synthetic light field towards a given eye of the at least one user, whilst optically combining said corresponding sub-part of the second part of the synthetic light field with the real-world light field of a real-world environment. Optionally, the optical combiner is implemented by way of at least one of: a semi-transparent mirror, a semi-transparent film, a semi-transparent flexible membrane, a beam splitter, a lens, a mirror, a prism, an optical waveguide, a polarizer. Optical combiners are well-known in the art. Optionally, a tilt angle of the optical combiner with respect to an image plane of the light field display unit lies in a range of 10 degrees and 75 degrees. It will be appreciated that when the system is implemented in a vehicle, and when a plurality of users are present inside the vehicle, some users may directly face the optical combiner (namely, in almost a straight manner), while remaining users may face the optical combiner in a diagonal manner (namely, obliquely or sideways). Notably, the optical combiner is arranged on an optical path of the light field display unit and on an optical path of the real-world light field.

Throughout the present disclosure, the term "real-world light field" refers to a light field emanating from the real-world environment. Further, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards eyes of the at least one user. In this way, visual information pertaining to said real-world objects is typically perceived by said eyes. On the other hand, in case of the synthetic light field, light emanating from the light field display unit, upon reflecting off the optical combiner, is incident on said eyes of the at least one user. In this way, visual information pertaining to the virtual content (presented by the synthetic light field) can be perceived by said eyes of the at least one user. Herein, the term "visual information" encompasses colour information pertaining to at least one of: a real-world object, the virtual content, and additionally, optionally other attributes (for example, such as depth information, illuminance information, transparency information, and the like) pertaining to the at least one of: the real-world object, the virtual content.

In some implementations, the virtual content presented by the synthetic light field corresponds to a virtual environment comprising at least one virtual object. Optionally, in this regard, the at least one processor is configured to generate the first region of the given light field image from a perspective of the position and the orientation of the first region of the light-emitting component with respect to the first eye and the second eye of the at least one user, by employing a three-dimensional (3D) model of the virtual environment. Similarly, optionally, the at least one processor is configured to generate the second region of the given light field image from a perspective of the relative location of the first eye and the second eye of the at least one user with respect to the optical combiner, and the position and the orientation of the second region of the light-emitting component, by employing the 3D model of the virtual environment. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain a first virtual image and a second virtual image to be presented to the first eye and the second eye of the at least one user in a form of a 2D user interface (UI) elements, respectively, and utilise the first virtual image and the second virtual image to generate the given light field image. The 2D UI elements could pertain to, for example, a virtual navigation tool, a virtual gadget, a virtual message, a virtual entity, a virtual entertainment media, a virtual information, or similar. In an example, when the system is implemented in the vehicle, the virtual content may pertain to real-time information of the vehicle, for example, such as a speed of the vehicle, a fuel indication, a tyre pressure indication, an engine status, a rear view of the vehicle, a navigation instruction for a driver in the vehicle, a digital map of a region in a real-world environment where the vehicle is present or is being driven, and the like.

There will now be described other optional embodiments of the system.

Optionally, at least a first sub-region of the first region of the given light field image and at least a second sub-region of the second region of the given light field image are generated based on same virtual content, wherein the first sub-region of the first region is adjacent to the second sub-region of the second region.

In this regard, the first sub-region is a portion of the first region of the given light field image that is responsible for producing a top portion of the first part of the synthetic light field. Thus, the first sub-region corresponds to a top portion of the first part of the viewing zone of the system that lies below the second part of the viewing zone of the system. As discussed earlier, the second part of the viewing zone corresponds to the synthetic light field (or its part) being reflected off the optical combiner towards the eyes of the at least one user. Further, the second sub-region is a portion of the second region of the given light field image that is responsible for producing a bottom portion of the second part of the synthetic light field. Thus, the second sub-region corresponds to a bottom portion of the second part of the viewing zone. A technical benefit of generating at least the first sub-region and at least the second sub-region based on the same virtual content (wherein the first sub-region is adjacent to the second sub-region) is that it provides a smooth visual transition between the top portion of the first part of the viewing zone and the bottom portion of the second part of the viewing zone. This facilitates in providing a seamless and continuous view of at least one virtual object (corresponding to the same virtual content) across a shared boundary between the first part of the viewing zone and the second part of the viewing zone, thereby facilitating an imperceptible and cohesive merging of visual information at said shared boundary. This potentially enhances a visual continuity within a field of view of the at least one user and an overall visual experience of the at least one user.

Optionally, the system further comprises at least one real-world facing camera, wherein the at least one processor is configured to:

detect when at least one virtual object is to be presented simultaneously via the optical combiner as well as directly via the light field display unit; and when it is detected that the at least one virtual object is to be presented simultaneously via the optical combiner as well as directly via the light field display unit, capture at least one real-world image of a region of a real-world environment that lies in a field of view of the at least one user when viewing through the optical combiner, by utilising the at least one real-world facing camera; and generate a first synthetic image and a second synthetic image by utilising the at least one real-world image, based on the relative location of the first eye and the second eye of the at least one user with respect to the optical combiner, and the position and the orientation of at least the first region of the light-emitting component of the light field display unit with respect to the first eye and the second eye of the at least one user, respectively, wherein when generating the first region of the given light field image, the at least one processor is configured to generate at least a first sub-region of the first region of the given light field image by utilising the first synthetic image and the second synthetic image.

The term "real-world-facing camera" refers to a camera that is arranged to face the region of the real-world environment that lies in the field of view of the at least one user when viewing through the optical combiner, and is employed to capture the at least one real-world image of said region of the real-world environment. It is to be understood that when the system is implemented in the vehicle, the real-world-facing camera is arranged to face a region of a real-world environment that lies in front of the vehicle. The at least one real-world-facing camera could comprise at least one visible-light camera, and additionally, optionally, comprise at least one depth camera. When the at least one virtual object is to be presented simultaneously via the optical combiner as well as directly via the light field display unit, it means that the at least one virtual object is intended to seamlessly span both the first part and the second part of the viewing zone of the system. The term "synthetic image" refers to an image representing a virtual representation of the region of the real-world environment that lies in the field of view of the at least one user.

Optionally, when generating the first synthetic image by utilising the at least one real-world image, the at least one processor is configured to at least reproject and/or crop the at least one real-world image, based on the relative location of the first eye and the second eye of the at least one user with respect to the optical combiner. It will be appreciated that generating the first synthetic image would allow the at least one processor to determine which portion of the at least one real-world image the at least one user is already seeing via the optical combiner. Beneficially, this allows to determine which portion of the at least one real-world image needs to be shown to the at least one user directly via the light field display unit. Similarly, optionally, when generating the second synthetic image by utilising the at least one real-world image, the at least one processor is configured to at least reproject and/or crop the at least one real-world image, based on the position and the orientation of the first region of the light-emitting component with respect to the first eye and the second eye of the at least one user.

Once the first synthetic image and the second synthetic image are generated, the first sub-region of the first region (that corresponds to the top portion of the first part of the viewing zone of the system that lies below the second part of the viewing zone of the system) is generated using the first synthetic image and the second synthetic image. A technical benefit of generating the first sub-region in the aforesaid manner is that it allows for providing a contextually-immersive and visually-cohesive experience to the at least one user, as a portion of the at least one virtual object corresponding to the first region of the given light field image appears to be well-blended with said region of the real-world environment. This helps in blending the at least one virtual object naturally with ambient colours, especially, towards the shared boundary between the first part and the second part of the viewing zone of the system (namely, to hide differences in brightness, colour balance, reprojection, or similar). Beneficially, due to this, an additive quality of the at least one virtual object is enhanced, making the at least one virtual object to be well-integrated with user's actual surroundings. The aforesaid blend effect would also provide a seamless and continuous view of at least one virtual object across said shared boundary, thereby reducing visual discrepancies and creating immersive augmented-reality experience for the at least one user.

Optionally, the at least one processor is configured to determine an amount of attenuation caused by the optical combiner to the real-world light field passing therethrough, wherein when generating the first region of the given light field image, the at least one processor is configured to generate intensity values of at least the first sub-region of the first region, based on the amount of attenuation.

A technical benefit of this is that it allows to compensate for an attenuation caused to the real-world light field by the optical combiner. If the amount of attenuation caused were not taken into account when generating the intensity values, the intensity values of at least the first sub-region of the first region (that corresponds to the top portion of the first part of the viewing zone of the system that lies below the second part of the viewing zone) would be taken as intensity values of pixels in at least one of: the first synthetic image, the second synthetic image (namely, as it is), wherein the at least one of: the first synthetic image, the second synthetic image, is generated by utilising the at least one real-world image, as discussed earlier. When these intensity values add up with an actual light intensity of the real-world light field that is passing through the optical combiner, it would produce a relatively brighter image of the real-world environment. This would not only make the at least one virtual object look darker as compared to at least one real-world object, but would also make the at least one real-world object look brighter than other real-world objects that can be seen through other portions of the optical combiner. Thus, a darkening effect is optionally applied to mimic a reduction in a transmission of the real-world light through the optical combiner.

The amount of attenuation can be determined in terms of a percentage by which the light intensity of the real-world light field reduces upon passing through the optical combiner. As a first example, when the system is implemented in the vehicle, and when a single user is present in the vehicle, the light intensity is typically reduced by approximately 50 percent upon passing through the optical combiner. This is because a first part and a second part of the real-world light field are re-directed towards the first eye and the second eye, respectively. As a second example, when the system is implemented in the vehicle, and when two users are present in the vehicle, the light intensity may be reduced by approximately 75 percent. Therefore, the intensity values for at least the first sub-region of the first region can be generated to compensate for the percentage by which the light intensity reduces. So, in the aforementioned first example, the intensity values can be determined as approximately 50 percent of the intensity values of the pixels in the at least one of: the first synthetic image, the second synthetic image. Herein, the phrase "approximately 50 percent" refers to a percentage that lies in a range of 45 percent to 55 percent. On the other hand, in the aforementioned second example, the intensity values can be determined as approximately 75 percent of the intensity values of the pixels in the at least one of: the first synthetic image, the second synthetic image. Herein, the phrase "approximately 75 percent" refers to a percentage that lies in a range of 70 percent to 80 percent.

Optionally, the at least one processor is configured to determine an average intensity of a real-world light field passing through the optical combiner, wherein when generating the first region of the given light field image, the at least one processor is configured to generate intensity values of at least a first sub-region of the first region, based on the average intensity of the real-world light field.

A technical benefit of this is that it allows virtual content corresponding to the first region of the given light field image (to be displayed via the first region of the light-emitting component) to adapt its brightness based on the real-world light field passing through the optical combiner, creating a visually consistent blend with virtual content corresponding to the second region of the given light field image (to be displayed via the second region of the light-emitting component). By determining the average intensity of the real-world light field through the optical combiner and adjusting the intensity values of at least the first sub-region of the first region (that corresponds to the top portion of the first part of the viewing zone that lies below the second part of the viewing zone) accordingly, the at least one processor enables in achieving an additive blending effect. Due to such additive blending effect, the virtual content to be presented near a shared boundary of the first part and the second part of the viewing zone is brightened in order to match a natural brightness seen through the optical combiner, especially in bright daylight conditions, thereby smoothing a transition between the first part and the second part of the viewing zone. Such an implementation facilitates the at least one virtual object (corresponding to the virtual content) to appear more blended with the real-world environment, particularly under varying lighting conditions, such as daytime or nighttime, enhancing a realism and immersiveness for the at least one user. Optionally, the system further comprises at least one ambient light sensor arranged facing the real-world light field, wherein the at least one ambient light sensor is operable to sense the average intensity of the real-world light field passing through the optical combiner. Additionally or alternatively, optionally, the at least one processor is configured to determine the average intensity based on a time of the day.

Optionally, the system is implemented in a vehicle, wherein the system further comprises a set of cameras arranged on an external body of the vehicle, wherein the at least one processor is configured to:

capture a set of real-world images of a region of a real-world environment that surrounds the vehicle, by utilising the set of cameras;

and generate at least one of: (i) a view of said region of the real-world environment, (ii) a 360-degree view of the vehicle in said region of the real-world environment, by utilising the set of real-world images;

wherein when generating the first region of the given light field image, the at least one processor is configured to generate at least a background of the first region by utilising the at least one of: (i) the view of said region of the real-world environment, (ii) the 360-degree view of the vehicle in said region of the real-world environment.

In this regard, the cameras of the set could be arranged on the external body of the vehicle (for example, such as a car) in a manner that said cameras face the region of the real-world environment that surrounds the vehicle. This enables the cameras to capture the set of real-world images of the region of the real-world environment that surrounds the vehicle. It will be appreciated that since poses (namely, positions and/or orientations) of the cameras in the set could be different (as they would likely be positioned at various locations for collectively capturing the 360-degree view of the vehicle), real-world images of the region would be captured from different perspectives of said poses of the cameras. Optionally, in this regard, when generating the at least one of: (i) the view of said region of the real-world environment, (ii) the 360-degree view of the vehicle, the at least one processor is configured to employ at least one image processing algorithm. The at least one image processing algorithm may comprise at least one of: an image stitching, an image merging algorithm, an image blending algorithm. Such image processing algorithms are well-known in the art. An image capturing operation is also well-known in the art.

A technical benefit of generating at least the background the first region of the given light field image in the aforesaid manner is that it enhances the driver's situational awareness by incorporating real time (or near-real time), contextually relevant background in the first region of the given light field image that is displayed via the first part of the synthetic light field that is directed towards the at least one user, without being reflected off the optical combiner. By using the view of said region and/or the 360-degree view of the vehicle, the background of the first region can provide a continuous representation of the vehicle's surroundings, which can be highly beneficial for the at least one user for performing critical manoeuvres, like turning or reversing the vehicle. This allows a driver of the vehicle to better judge distances from curbs, obstacles, and other features present outside the vehicle. Consequently, this also provides real-time spatial awareness to the driver, supporting safer and more informed driving decisions.

Optionally, the system is implemented in a vehicle, wherein the system further comprises lane detectors, wherein the at least one processor is configured to determine a relative position of the vehicle with respect to lane markings on a road, wherein when generating the first region of the given light field image, the at least one processor is configured to:

depict external boundaries of the vehicle in the first region of the given light field image by utilising a 3D model of the vehicle, based on the position and the orientation of at least the first region of the light-emitting component of the light field display unit with respect to the first eye and the second eye of the at least one user, and a position and an orientation of the first region of the light-emitting component in the vehicle; and depict, in the first region of the given light field image, the lane markings with respect to the external boundaries of the vehicle, based on the relative position of the vehicle with respect to the lane markings.

A technical benefit of this is that it facilitates in providing the at least one user (specifically, the driver) of the vehicle an accurate, real-time spatial awareness of the position of the vehicle within its lane. This is because by depicting both the external boundaries of the vehicle and the lane markings within the first region of the given light field image, the system enables in providing a clear, visually-aligned reference of how the vehicle is positioned relative to the road lanes. Beneficially, this enhances a safety by enabling the driver to quickly assess lane alignment and any deviations from lane markings, aiding in precise manoeuvring of the vehicle and reducing a risk of unintentional lane departures or accidents.

It will be appreciated that the lane detectors could be implemented using cameras and/or other types of sensors (for example, such as LiDAR sensors, IR sensors, Global Positioning System (GPS), Inertial Measurement Unit (IMU), magnetic sensors (when magnetic markers are embedded in roads), and the like). Such other types of sensors can be employed to complement the cameras, particularly in challenging environments (for example, such as low light, snow, and the like) where the cameras alone may not perform optimally (namely, accurately). It will also be appreciated that since a position of the vehicle is known to the at least one processor in real time, and a position of a given lane marking on a road could be known from a given lane detector, the relative position of the vehicle with respect to the given lane marking could be easily determined. Optionally, the 3D model of the vehicle is pre-generated and pre-stored at the data repository. The 3D model of the vehicle could be generated using a plurality of a 3D Computer-Aided Design (CAD) images.

Optionally, the at least one processor is configured to:

determine gaze directions of eyes of the at least one user, by utilising the tracking means;

detect whether the gaze directions of the eyes of the at least one user pass through the light field display unit or the optical combiner; and when it is detected that the gaze directions pass through the optical combiner, perform at least one of:

lower a resolution of respective first regions of light field images to be displayed;

selectively lower a frame rate at which the respective first regions of the light field images are to be displayed;

generate the respective first regions of the light field images to present at least one virtual object at an optical depth that is within a predefined threshold distance from a distance of the light-emitting component of the light field display unit from the at least one user.

Optionally, the at least one processor is configured to utilise the tracking data collected by the tracking means, for determining a gaze direction of a given eye of the at least one user. This allows for ascertaining when the at least one user gazes at the light field display unit or the optical combiner. Optionally, in this regard, when the tracking data comprises a plurality of images of a given eye of a given user, the at least one processor is configured to: extract a plurality of features of the given eye from a given image; identify at least one of: a pupil of the given eye, a position of the pupil with respect to corners of the given eye, a curvature of an eyelid of the given eye, a position of an eyelash of the given eye, a shape of the given eye, a size of the given eye, based on the plurality of features, to determine the gaze direction of the given eye.

When it is detected that the gaze directions pass through the optical combiner, and do not pass through the light field display unit, the respective first regions of the light field images (to be displayed via respective first regions of the light-emitting component) may be generated at a lower resolution and/or the frame rate of displaying the respective first regions of the light field images is selectively lowered. Optionally, when it is detected that the gaze directions pass through the light field display unit, and do not pass through the optical combiner (when the given user is not seeing through the optical combiner), perform at least one of: lower a resolution of respective second regions of the light field images to be displayed, selectively lower a frame rate at which the respective second regions of the light field images are to be displayed.

Additionally or alternatively, when it is detected that the gaze directions pass through the optical combiner, the at least one virtual object is presented at the optical depth that is within the predefined threshold distance (namely, that is similar to the native optical depth of the first region of the light-emitting component of the light field display unit). In such a case, there may not be any need for displaying different virtual images (representing the at least one virtual object) to the first eye and the second eye of the at least one user; in other words, a same virtual image could be shown to both eyes of the at least one user in a 2D manner. The predefined threshold distance is kept short (for example, such as 10 centimetres), so that the optical depth is approximately equal to the distance.

Advantageously, lowering the resolution of the respective first regions of the light field images or lowering the frame rate facilitates in saving processing resources and processing time of the at least one processor. This is because since the at least one user is not even looking/gazing through the light field display unit (i.e., when the light field display unit lies in a peripheral region of a field of view of the at least one user), it would not be beneficial to generate the respective first regions of the light field images at a high resolution, or to even display the respective first regions of the light field images at a high frame rate. Similarly, it would not be beneficial to generate different virtual images to be presented to the eyes of the at least one user, when the gaze directions pass through the optical combiner only.

There will now be discussed an exemplary use case of implementing the aforementioned system implemented in a military vehicle navigating a minefield with access to a pre-existing 3D map of the minefield. In this scenario, a 3D map of danger zones (i.e., mines) is provided to a driver of the military vehicle. For danger zones visible within the optical combiner, such danger zones are displayed with stereoscopic depth (i.e., by way of generating the second region of the given light field image) to enhance the driver's spatial awareness and navigation accuracy. For danger zones outside physical constraints of the optical combiner, the first region of the light-emitting component of the light field display unit is used. In this regard, the position and the orientation of the first region of the light-emitting component of the light field display unit with respect to the first eye and the second eye of the at least one user is taken into account, allowing the system to project locations of danger zone accurately onto interior surfaces of the military vehicle at accurate optical depths. This alignment enables the projected danger zone markers to match their real-world positions. In such an example, a danger zone may be located one meter in front of a right front wheel of the military vehicle. As a projected danger zone shifts into the first part of the viewing zone of the system, a transition effect occurs in a peripheral area of a windshield of the military vehicle (approximately 5 to 10 centimeters wide). In this region, a 2D projection effect at an interior surface depth smoothly transitions to a correct 3D depth, as a danger zone marker enters further into a view of the optical combiner. Such a gradual transition provides a seamless experience as danger zone markers move between the first part of the viewing zone and the second part of the viewing zone, maintaining the situational awareness for the driver. In this exemplary use case, the light field display unit may also be roof-mounted.

The present disclosure also relates to the method as described above. Various embodiments and variants disclosed above, with respect to the aforementioned first aspect, apply mutatis mutandis to the method.

In an embodiment, the method further comprises controlling a first region of an active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user, wherein the active optical element is arranged on an optical path of the light-emitting component.

In an alternative embodiment, the method further comprises:

controlling a first region of an active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user, wherein the active optical element is arranged on an optical path of the light-emitting component; and controlling a second region of the active optical element that corresponds to the second region of the light-emitting component of the light field display unit, based on the relative location of the first eye and the second eye of the at least one user with respect to the optical combiner, and the position and the orientation of the second region of the light-emitting component with respect to the optical combiner, to re-direct the respective sub-parts of the second part of the synthetic light field corresponding to the second region of the given light field image towards the optical combiner.

Optionally, the method further comprises:

detecting when virtual content is to be presented directly via the light field display unit only; and when it is detected that the virtual content is to be presented directly via the light field display unit only, generating another light field image to be displayed via the light field display unit, based on a position and an orientation of at least a region of the light-emitting component of the light field display unit with respect to the first eye and the second eye of the at least one user, wherein at least said region of the light-emitting component is to be employed to present the virtual content;

displaying the another light field image via the light field display unit to produce another synthetic light field; and controlling an active optical element, based on the position and the orientation of at least said region of the light-emitting component with respect to the first eye and the second eye of the at least one user, to re-direct respective parts of the another synthetic light field towards the first eye and the second eye of the at least one user, wherein the active optical element is arranged on an optical path of the light-emitting component.

Optionally, the method further comprises:

detecting when virtual content is to be presented via the optical combiner only; and when it is detected that the virtual content is to be presented via the optical combiner only, generating yet another light field image to be displayed via the light field display unit, based on the relative location of the first eye and the second eye of the at least one user with respect to the optical combiner, and a position and an orientation of at least a region of the light-emitting component of the light field display unit with respect to the optical combiner, wherein at least said region of the light-emitting component is to be employed to present the virtual content;

displaying the yet another light field image via the light field display unit to produce yet another synthetic light field; and controlling an active optical element, based on the relative location of the first eye and the second eye of the at least one user with respect to the optical combiner, and the position and the orientation of at least said region of the light-emitting component with respect to the optical combiner, to re-direct the yet another synthetic light field towards the optical combiner, wherein the active optical element is arranged on an optical path of the light-emitting component, wherein the optical combiner is employed to reflect respective parts of the yet another synthetic light field towards the first eye and the second eye of the at least one user, whilst optically combining the real-world light field with the respective parts of the yet another synthetic light field.

Optionally, the method further comprises:

generating a first light field image to be displayed via the light field display unit, based on a position and an orientation of the light-emitting component of the light field display unit with respect to the first eye and the second eye of the at least one user;

generating a second light field image to be displayed via the light field display unit, based on the relative location of the first eye and the second eye of the at least one user with respect to the optical combiner, and a position and an orientation of the light-emitting component of the light field display unit with respect to the optical combiner;

displaying the first light field image and the second light field image, via the light field display unit, to produce a first synthetic light field and a second synthetic light field, respectively, wherein the first light field image and the second light field image are displayed by employing temporal multiplexing;

when displaying the first light field image, controlling an active optical element, based on the position and the orientation of the light-emitting component with respect to the first eye and the second eye of the at least one user, to re-direct respective parts of the first synthetic light field towards the first eye and the second eye of the at least one user, wherein the active optical element is arranged on an optical path of the light-emitting component; and when displaying the second light field image, controlling the active optical element, based on the relative location of the first eye and the second eye of the at least one user with respect to the optical combiner, and the position and the orientation of the light-emitting component with respect to the optical combiner, to re-direct the second synthetic light field towards the optical combiner, wherein the optical combiner is employed to reflect respective parts of the second synthetic light field towards the first eye and the second eye of the at least one user, whilst optically combining the real-world light field with the respective parts of the second synthetic light field.

Optionally, in the method, at least a first sub-region of the first region of the given light field image and at least a second sub-region of the second region of the given light field image are generated based on same virtual content, wherein the first sub-region of the first region is adjacent to the second sub-region of the second region.

Optionally, the method further comprises:

detecting when at least one virtual object is to be presented simultaneously via the optical combiner as well as directly via the light field display unit; and when it is detected that the at least one virtual object is to be presented simultaneously via the optical combiner as well as directly via the light field display unit, capturing at least one real-world image of a region of a real-world environment that lies in a field of view of the at least one user when viewing through the optical combiner, by utilising at least one real-world facing camera; and generating a first synthetic image and a second synthetic image by utilising the at least one real-world image, based on the relative location of the first eye and the second eye of the at least one user with respect to the optical combiner, and the position and the orientation of at least the first region of the light-emitting component of the light field display unit with respect to the first eye and the second eye of the at least one user, respectively, wherein the step of generating the first region of the given light field image comprises generating at least a first sub-region of the first region of the given light field image by utilising the first synthetic image and the second synthetic image.

Optionally, the method further comprises determining an amount of attenuation caused by the optical combiner to the real-world light field passing therethrough, wherein the step of generating the first region of the given light field image comprises generating intensity values of at least the first sub-region of the first region, based on the amount of attenuation.

Optionally, the method further comprises determining an average intensity of a real-world light field passing through the optical combiner, wherein the step of generating the first region of the given light field image comprises generating intensity values of at least a first sub-region of the first region, based on the average intensity of the real-world light field.

Optionally, the method is implemented in a vehicle, wherein the method further comprises:

capturing a set of real-world images of a region of a real-world environment that surrounds the vehicle, by utilising a set of cameras arranged on an external body of the vehicle; and generating at least one of: (i) a view of said region of the real-world environment, (ii) a 360-degree view of the vehicle in said region of the real-world environment, by utilising the set of real-world images, wherein the step of generating the first region of the given light field image comprises generating at least a background of the first region by utilising the at least one of: (i) the view of said region of the real-world environment, (ii) the 360-degree view of the vehicle in said region of the real-world environment.

Optionally, the method is implemented in a vehicle, wherein the method further comprises determining a relative position of the vehicle with respect to lane markings on a road, by utilising lane detectors, wherein the step of generating the first region of the given light field image comprises:

depicting external boundaries of the vehicle in the first region of the given light field image by utilising a 3D model of the vehicle, based on the position and the orientation of at least the first region of the light-emitting component of the light field display unit with respect to the first eye and the second eye of the at least one user, and a position and an orientation of the first region of the light-emitting component in the vehicle; and depicting, in the first region of the given light field image, the lane markings with respect to the external boundaries of the vehicle, based on the relative position of the vehicle with respect to the lane markings.

Optionally, the method further comprises:

determining gaze directions of eyes of the at least one user, by utilising the tracking means;

detecting whether the gaze directions of the eyes of the at least one user pass through the light field display unit or the optical combiner; and when it is detected that the gaze directions pass through the optical combiner, performing at least one of:

lowering a resolution of respective first regions of light field images to be displayed;

selectively lowering a frame rate at which the respective first regions of the light field images are to be displayed;

generating the respective first regions of the light field images to present at least one virtual object at an optical depth that is within a predefined threshold distance from a distance of the light-emitting component of the light field display unit from the at least one user.

DETAILED DESCRIPTION OF THE DRAWINGS

Figure 1B:
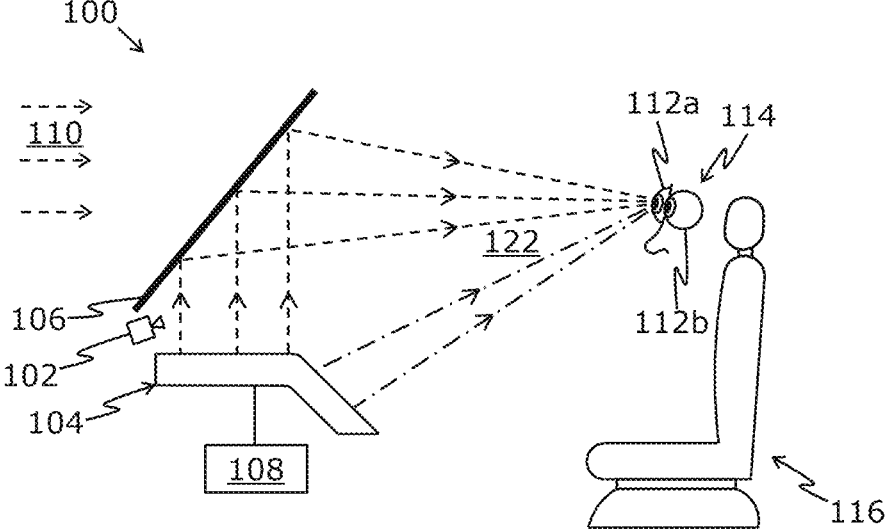
Figure 1C:
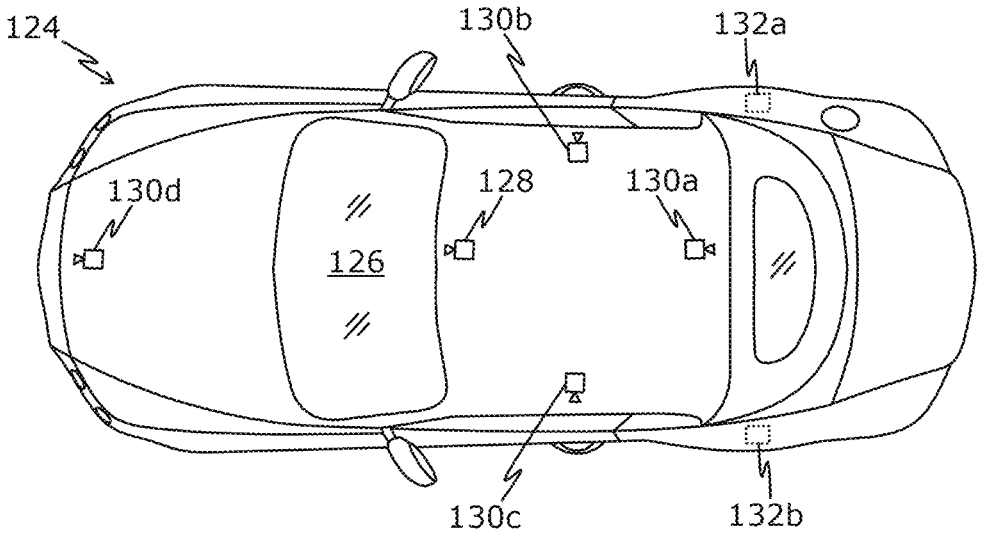

Referring to FIGS. 1A, 1B, and 1C, illustrated are simplified example implementations of a system 100 incorporating a hybrid heads-up display for presenting virtual content outside boundaries, in accordance with an embodiment of the present disclosure. With reference to FIGS. 1A, 1B, and 1C, the system 100 is shown to be implemented, for example, in a vehicle (for example, such as a car). For sake of simplicity and clarity, some components of the system 100 are shown to be represented in FIGS. 1A and 1B, while other components of the system 100 are shown to be represented in FIG. 1C.

With reference to FIGS. 1A and 1B, the system 100 comprises tracking means 102, a light field display unit 104, an optical combiner 106, and at least one processor (for example, depicted as a processor 108). The optical combiner 106 is arranged on an optical path of the light field display unit 104 and on an optical path of a real-world light field 110. The light field display unit 104 is arranged, for example, on a dashboard of the vehicle. The optical combiner 106 is implemented, for example, using a transparent portion of a windshield of the vehicle. The tracking means 102 is shown to be implemented, for example, as a tracking camera. Notably, the tracking means 102 is utilised for tracking a location of a first eye 112a and a second eye 112b of a user 114. The user 114 is seated on a seat 116 of the vehicle. The processor 108 is communicably coupled to at least the tracking means 102 and the light field display unit 104.

With reference to FIG. 1A, the light field display unit 104 optionally comprises a light-emitting component 118 (for example, depicted using a wavy lines pattern) and an active optical element 120 (for example, depicted using a diagonal lines pattern), wherein the active optical element 120 is arranged on an optical path of the light-emitting component 118.

When the system 100 is in use, the processor 108 is configured to: generate a first region and a second region of a given light field image (not shown); and display the given light field image via the light field display unit 104 to produce a synthetic light field 122, wherein a first part (for example, depicted using dashed lines with arrows) of the synthetic light field 122 corresponding to the first region of the given light field image is directed towards the user 114, whilst a second part (for example, depicted using dash-dot lines with arrows) of the synthetic light field 122 corresponding to the second region of the given light field image is directed towards the optical combiner 106, wherein the optical combiner 106 is employed to reflect respective sub-parts of the second part of the synthetic light field 122 towards a first eye 112a and a second eye 112b of the user 114, whilst optically combining the real-world light field 110 with the respective sub-parts of the second part of the synthetic light field 122.

With reference to FIG. 1A, the light field display unit 104 is shown to be planar. Herein, the active optical element 120 can be employed to re-direct respective sub-parts of the first part of the synthetic light field 122 towards the first eye 112a and the second eye 112b of the user 114, and to re-direct the respective sub-parts of the second part of the synthetic light field 122 towards the optical combiner 106. With reference to FIG. 1B, the light field display unit 104 is shown to be curved such that a curved portion of the dashboard faces the user 114. Herein, the first part of the synthetic light field 122 can be directed towards the user 114, and the second part of the synthetic light field 122 can be directed towards the optical combiner 106, without employing the active optical element 120 (as shown in FIG. 1A).

With reference to FIG. 1C, there is shown a simplified schematic top view of the vehicle 124 in which the system 100 (as shown in FIGS. 1A and 1B) is implemented. As shown, a windshield 126 of the vehicle 124 is utilised as the optical combiner 106 (as shown in FIGS. 1A and 1B). Optionally, the system 100 further comprises at least one real-world facing camera (for example, depicted as a real-world facing camera 128), a set of cameras (for example, depicted as a set of four cameras 130a, 130b, 130c, and 130d), lane detectors (for example, depicted as two lane detectors 132a and 132b). The real-world facing camera 128 is utilised to capture at least one real-world image of a region of a real-world environment that lies in a field of view of the user 114 when viewing through the optical combiner 106. The set of cameras 130a-d are shown to be arranged on four different sides of an external body of the vehicle 124, wherein the set of cameras 130a-d is utilised for capturing a set of real-world images of a region of the real-world environment that surrounds the vehicle 124. Optionally, the processor 108 (as shown in FIGS. 1A and 1B) is communicably coupled to at least one of: the real-world facing camera 128, the cameras 130a-d, the lane detectors 132a-b.

It may be understood by a person skilled in the art that FIGS. 1A, 1C, and 1C include simplified example implementations of the system 100, for sake of clarity, which should not unduly limit the scope of the claims herein. It is to be understood that a specific implementation of the system 100 is not to be construed as limiting it to specific numbers or types of tracking means, light field display units, optical combiners, processors, real-world facing cameras, sets of cameras, and lane detectors. The person skilled in the art will recognize many variations, alternatives, and modifications of embodiments of the present disclosure.

Figure 2:
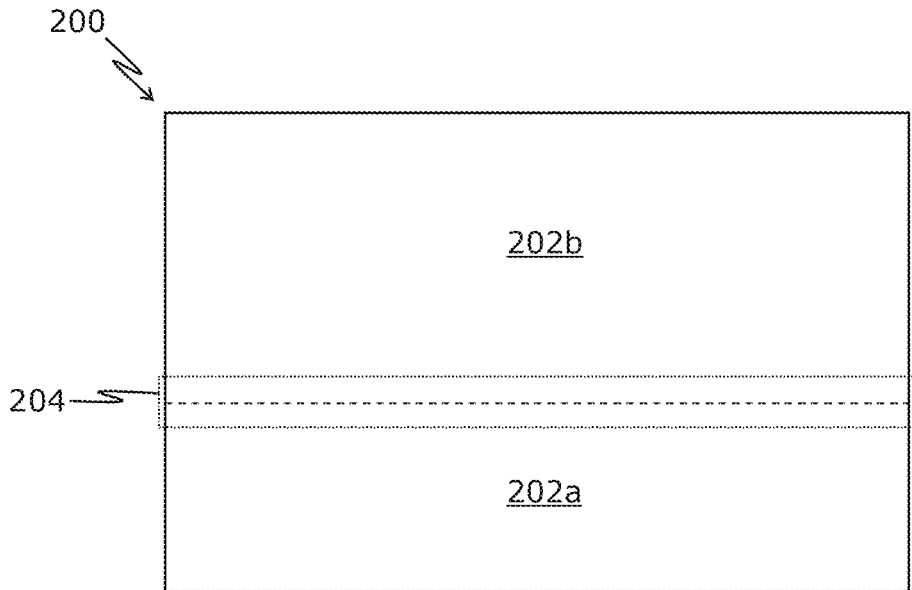
FIG. 2 illustrates different parts of a viewing zone of a system incorporating a hybrid heads-up display for presenting virtual content outside boundaries, in accordance with an embodiment of the present disclosure.

Referring to FIG. 2, illustrated are different parts of a viewing zone 200 of a system (such as the system 100 as shown in FIGS. 1A and 1B) incorporating a hybrid heads-up display for presenting virtual content outside boundaries, in accordance with an embodiment of the present disclosure. Herein, the viewing zone 200 comprises a first part 202a and a second part 202b, wherein a first part of a synthetic light field (corresponding to a first region of a given light field image) spans the first part 202a of the viewing zone 200, while a second part of the synthetic light field (corresponding to a second region of the given light field image) spans the second part 202b of the viewing zone 200. As shown, the first part 202a of the viewing zone 200 lies below the second part 202b of the viewing zone 200. The first part 202a and the second part 202b could overlap partially to enable a seamless transition therebetween. Beneficially, due to this an effective viewing area for presenting virtual content (by producing the synthetic light field) to at least one user is significantly increased. A blending zone 204 (depicted using a dotted box) represents a transition area between the first part 202a of the viewing zone 200 and the second part 202b of the viewing zone 200. It will be appreciated that the aforesaid viewing zones may have shapes and/or sizes different from those as shown in FIG. 2.

FIG. 2 is merely an example, which should not unduly limit the scope of the claims herein. A person skilled in the art will recognize many variations, alternatives, and modifications of embodiments of the present disclosure.

Figure 3:
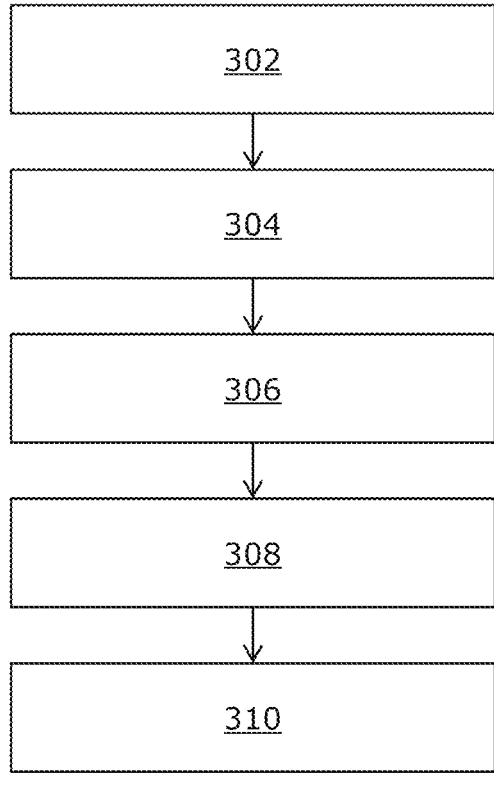
FIG. 3 illustrates steps of a method incorporating a hybrid heads-up display for presenting virtual content outside boundaries, in accordance with an embodiment of the present disclosure.

Referring to FIG. 3, illustrated are steps of a method incorporating a hybrid heads-up display for presenting virtual content outside boundaries, in accordance with an embodiment of the present disclosure. At step 302, a relative location of a first eye and a second eye of at least one user with respect to an optical combiner is determined by utilising tracking means. At step 304, a position and an orientation of at least a first region of a light-emitting component of a light field display unit with respect to the first eye and the second eye of the at least one user, are determined by utilising the tracking means. At step 306, a first region of a given light field image to be displayed via the light field display unit is generated, based on the position and the orientation of at least the first region of the light-emitting component of the light field display unit with respect to the first eye and the second eye of the at least one user, wherein the first region of the light-emitting component is to be employed to display the first region of the given light field image. At step 308, a second region of the given light field image is generated, based on the relative location of the first eye and the second eye of the at least one user with respect to the optical combiner, and a position and an orientation of a second region of the light-emitting component of the light field display unit with respect to the optical combiner, wherein the second region of the light-emitting component is to be employed to display the second region of the given light field image, the second region being different from the first region. At step 310, the given light field image is displayed via the light field display unit to produce a synthetic light field, wherein a first part of the synthetic light field corresponding to the first region of the given light field image is directed towards the at least one user, whilst a second part of the synthetic light field corresponding to the second region of the given light field image is directed towards the optical combiner, wherein the optical combiner is employed to reflect respective sub-parts of the second part of the synthetic light field towards the first eye and the second eye of the at least one user, whilst optically combining a real-world light field with the respective sub-parts of the second part of the synthetic light field.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
tracking means;
a light field display unit;
an optical combiner; and
at least one processor configured to:
    determine a relative location of a first eye and a second eye of at least one user with respect to the optical combiner, by utilising the tracking means;
    determine a position and an orientation of at least a first region of a light-emitting component of the light field display unit with respect to the first eye and the second eye of the at least one user, by utilising the tracking means;
    generate a first region of a given light field image to be displayed via the light field display unit, based on the position and the orientation of at least the first region of the light-emitting component of the light field display unit with respect to the first eye and the second eye of the at least one user, wherein the first region of the light-emitting component is employed to display the first region of the given light field image;
    generate a second region of the given light field image, based on the relative location of the first eye and the second eye of the at least one user with respect to the optical combiner, and a position and an orientation of a second region of the light-emitting component of the light field display unit with respect to the optical combiner, wherein the second region of the light-emitting component is employed to display the second region of the given light field image, the second region being different from the first region; and
    display the given light field image via the light field display unit to produce a synthetic light field, wherein a first part of the synthetic light field corresponding to the first region of the given light field image is directed towards the at least one user, while a second part of the synthetic light field corresponding to the second region of the given light field image is directed towards the optical combiner,
wherein the optical combiner is employed to reflect respective sub-parts of the second part of the synthetic light field towards the first eye and the second eye of the at least one user, while optically combining a real-world light field with the respective sub-parts of the second part of the synthetic light field.

2. The system of claim 1, wherein the light field display unit further comprises an active optical element arranged on an optical path of the light-emitting component, wherein the at least one processor is configured to:
    control a first region of the active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user.

3. The system of claim 1, wherein the light field display unit further comprises an active optical element arranged on an optical path of the light-emitting component, wherein the at least one processor is configured to:
    control a first region of the active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user; and
    control a second region of the active optical element that corresponds to the second region of the light-emitting component of the light field display unit, based on the relative location of the first eye and the second eye of the at least one user with respect to the optical combiner, and the position and the orientation of the second region of the light-emitting component with respect to the optical combiner, to re-direct the respective sub-parts of the second part of the synthetic light field corresponding to the second region of the given light field image towards the optical combiner.

4. The system of claim 1, wherein the light field display unit further comprises an active optical element arranged on an optical path of the light-emitting component, wherein the at least one processor is configured to:
    detect when virtual content is to be presented directly via the light field display unit only; and
    when it is detected that the virtual content is to be presented directly via the light field display unit only, generate another light field image to be displayed via the light field display unit, based on a position and an orientation of at least a region of the light-emitting component of the light field display unit with respect to the first eye and the second eye of the at least one user, wherein at least said region of the light-emitting component is to be employed to present the virtual content;

display the another light field image via the light field display unit to produce another synthetic light field; and control the active optical element, based on the position and the orientation of at least said region of the light-emitting component with respect to the first eye and the second eye of the at least one user, to re-direct respective parts of the another synthetic light field towards the first eye and the second eye of the at least one user.

5. The system of claim 1, wherein the light field display unit further comprises an active optical element arranged on an optical path of the light-emitting component, wherein the at least one processor is configured to:

detect when virtual content is to be presented via the optical combiner only; and when it is detected that the virtual content is to be presented via the optical combiner only, generate yet another light field image to be displayed via the light field display unit, based on the relative location of the first eye and the second eye of the at least one user with respect to the optical combiner, and a position and an orientation of at least a region of the light-emitting component of the light field display unit with respect to the optical combiner, wherein at least said region of the light-emitting component is to be employed to present the virtual content;

display the yet another light field image via the light field display unit to produce yet another synthetic light field; and control the active optical element, based on the relative location of the first eye and the second eye of the at least one user with respect to the optical combiner, and the position and the orientation of at least said region of the light-emitting component with respect to the optical combiner, to re-direct the yet another synthetic light field towards the optical combiner, wherein the optical combiner is employed to reflect respective parts of the yet another synthetic light field towards the first eye and the second eye of the at least one user, while optically combining the real-world light field with the respective parts of the yet another synthetic light field.

6. The system of claim 1, wherein the light field display unit further comprises an active optical element arranged on an optical path of the light-emitting component, wherein the at least one processor is configured to:

generate a first light field image to be displayed via the light field display unit, based on a position and an orientation of the light-emitting component of the light field display unit with respect to the first eye and the second eye of the at least one user;

generate a second light field image to be displayed via the light field display unit, based on the relative location of the first eye and the second eye of the at least one user with respect to the optical combiner, and a position and an orientation of the light-emitting component of the light field display unit with respect to the optical combiner;

display the first light field image and the second light field image, via the light field display unit, to produce a first synthetic light field and a second synthetic light field, respectively, wherein the first light field image and the second light field image are displayed by employing temporal multiplexing;

when displaying the first light field image, control the active optical element, based on the position and the orientation of the light-emitting component with respect to the first eye and the second eye of the at least one user, to re-direct respective parts of the first synthetic light field towards the first eye and the second eye of the at least one user; and when displaying the second light field image, control the active optical element, based on the relative location of the first eye and the second eye of the at least one user with respect to the optical combiner, and the position and the orientation of the light-emitting component with respect to the optical combiner, to re-direct the second synthetic light field towards the optical combiner, wherein the optical combiner is employed to reflect respective parts of the second synthetic light field towards the first eye and the second eye of the at least one user, while optically combining the real-world light field with the respective parts of the second synthetic light field.

7. The system of claim 1, wherein at least a first sub-region of the first region of the given light field image and at least a second sub-region of the second region of the given light field image are generated based on same virtual content, wherein the first sub-region of the first region is adjacent to the second sub-region of the second region.

8. The system of claim 1, further comprising at least one real-world facing camera, wherein the at least one processor is configured to:

detect when at least one virtual object is to be presented simultaneously via the optical combiner as well as directly via the light field display unit; and when it is detected that the at least one virtual object is to be presented simultaneously via the optical combiner as well as directly via the light field display unit, capture at least one real-world image of a region of a real-world environment that lies in a field of view of the at least one user when viewing through the optical combiner, by utilising the at least one real-world facing camera; and generate a first synthetic image and a second synthetic image by utilising the at least one real-world image, based on the relative location of the first eye and the second eye of the at least one user with respect to the optical combiner, and the position and the orientation of at least the first region of the light-emitting component of the light field display unit with respect to the first eye and the second eye of the at least one user, respectively, wherein when generating the first region of the given light field image, the at least one processor is configured to generate at least a first sub-region of the first region of the given light field image by utilising the first synthetic image and the second synthetic image.

9. The system of claim 8, wherein the at least one processor is configured to determine an amount of attenuation caused by the optical combiner to the real-world light field passing therethrough, wherein when generating the first region of the given light field image, the at least one processor is configured to generate intensity values of at least the first sub-region of the first region, based on the amount of attenuation.

10. The system of claim 1, wherein the at least one processor is configured to determine an average intensity of a real-world light field passing through the optical combiner, wherein when generating the first region of the given light field image, the at least one processor is configured to generate intensity values of at least a first sub-region of the first region, based on the average intensity of the real-world light field.

11. The system of claim 1, wherein the system is implemented in a vehicle, the system further comprising a set of cameras arranged on an external body of the vehicle, wherein the at least one processor is configured to:

capture a set of real-world images of a region of a real-world environment that surrounds the vehicle, by utilising the set of cameras; and generate at least one of: (i) a view of said region of the real-world environment, (ii) a 360-degree view of the vehicle in said region of the real-world environment, by utilising the set of real-world images, wherein when generating the first region of the given light field image, the at least one processor is configured to generate at least a background of the first region by utilising the at least one of: (i) the view of said region of the real-world environment, (ii) the 360-degree view of the vehicle in said region of the real-world environment.

12. The system of claim 1, wherein the system is implemented in a vehicle, the system further comprising lane detectors, wherein the at least one processor is configured to determine a relative position of the vehicle with respect to lane markings on a road, wherein when generating the first region of the given light field image, the at least one processor is configured to:

depict external boundaries of the vehicle in the first region of the given light field image by utilising a 3D model of the vehicle, based on the position and the orientation of at least the first region of the light-emitting component of the light field display unit with respect to the first eye and the second eye of the at least one user, and a position and an orientation of the first region of the light-emitting component in the vehicle; and depict, in the first region of the given light field image, the lane markings with respect to the external boundaries of the vehicle, based on the relative position of the vehicle with respect to the lane markings.

13. A system comprising:

tracking means;

a light field display unit;

an optical combiner; and at least one processor configured to:

determine a relative location of a first eye and a second eye of at least one user with respect to the optical combiner, by utilising the tracking means;

determine a position and an orientation of at least a first region of a light-emitting component of the light field display unit with respect to the first eye and the second eye of the at least one user, by utilising the tracking means;

generate a first region of a given light field image to be displayed via the light field display unit, based on the position and the orientation of at least the first region of the light-emitting component of the light field display unit with respect to the first eye and the second eye of the at least one user, wherein the first region of the light-emitting component is to be employed to display the first region of the given light field image;

generate a second region of the given light field image, based on the relative location of the first eye and the second eye of the at least one user with respect to the optical combiner, and a position and an orientation of a second region of the light-emitting component of the light field display unit with respect to the optical combiner, wherein the second region of the light-emitting component is to be employed to display the second region of the given light field image, the second region being different from the first region; and display the given light field image via the light field display unit to produce a synthetic light field, wherein a first part of the synthetic light field corresponding to the first region of the given light field image is directed towards the at least one user, while a second part of the synthetic light field corresponding to the second region of the given light field image is directed towards the optical combiner, wherein the optical combiner is employed to reflect respective sub-parts of the second part of the synthetic light field towards the first eye and the second eye of the at least one user, while optically combining a real-world light field with the respective sub-parts of the second part of the synthetic light field, wherein the at least one processor is further configured to:

determine gaze directions of eyes of the at least one user, by utilising the tracking means;

detect whether the gaze directions of the eyes of the at least one user pass through the light field display unit or the optical combiner; and when it is detected that the gaze directions pass through the optical combiner, perform at least one of:

lower a resolution of respective first regions of light field images to be displayed;

selectively lower a frame rate at which the respective first regions of the light field images are to be displayed;

generate the respective first regions of the light field images to present at least one virtual object at an optical depth that is within a predefined threshold distance from a distance between the light-emitting component of the light field display unit and the at least one user.

14. A method comprising:

determining a relative location of a first eye and a second eye of at least one user with respect to an optical combiner, by utilising tracking means;

determining a position and an orientation of at least a first region of a light-emitting component of a light field display unit with respect to the first eye and the second eye of the at least one user, by utilising the tracking means;

generating a first region of a given light field image to be displayed via the light field display unit, based on the position and the orientation of at least the first region of the light-emitting component of the light field display unit with respect to the first eye and the second eye of the at least one user, wherein the first region of the light-emitting component is to be employed to display the first region of the given light field image;

generating a second region of the given light field image, based on the relative location of the first eye and the second eye of the at least one user with respect to the optical combiner, and a position and an orientation of a second region of the light-emitting component of the light field display unit with respect to the optical combiner, wherein the second region of the light-emitting component is to be employed to display the second region of the given light field image, the second region being different from the first region; and displaying the given light field image via the light field display unit to produce a synthetic light field, wherein a first part of the synthetic light field corresponding to the first region of the given light field image is directed towards the at least one user, while a second part of the synthetic light field corresponding to the second region of the given light field image is directed towards the optical combiner, wherein the optical combiner is employed to reflect respective sub-parts of the second part of the synthetic light field towards the first eye and the second eye of the at least one user, while optically combining a real-world light field with the respective sub-parts of the second part of the synthetic light field.

15. The method of claim 14, further comprising controlling a first region of an active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user, wherein the active optical element is arranged on an optical path of the light-emitting component.

16. The method of claim 14, further comprising:

controlling a first region of an active optical element that corresponds to the first region of the light-emitting component of the light field display unit, based on the position and the orientation of the first region of the light-emitting component with respect to the first eye and the second eye of the at least one user, to re-direct respective sub-parts of the first part of the synthetic light field corresponding to the first region of the given light field image towards the first eye and the second eye of the at least one user, wherein the active optical element is arranged on an optical path of the light-emitting component; and controlling a second region of the active optical element that corresponds to the second region of the light-emitting component of the light field display unit, based on the relative location of the first eye and the second eye of the at least one user with respect to the optical combiner, and the position and the orientation of the second region of the light-emitting component with respect to the optical combiner, to re-direct respective sub-parts of the second part of the synthetic light field corresponding to the second region of the given light field image towards the optical combiner.

17. The method of claim 14, further comprising:

detecting when virtual content is to be presented directly via the light field display unit only; and when it is detected that the virtual content is to be presented directly via the light field display unit only, generating another light field image to be displayed via the light field display unit, based on a position and an orientation of at least a region of the light-emitting component of the light field display unit with respect to the first eye and the second eye of the at least one user, wherein at least said region of the light-emitting component is to be employed to present the virtual content;

displaying the another light field image via the light field display unit to produce another synthetic light field; and controlling an active optical element, based on the position and the orientation of at least said region of the light-emitting component with respect to the first eye and the second eye of the at least one user, to re-direct respective parts of the another synthetic light field towards the first eye and the second eye of the at least one user, wherein the active optical element is arranged on an optical path of the light-emitting component.

18. The method of claim 14, further comprising:

detecting when virtual content is to be presented via the optical combiner only; and when it is detected that the virtual content is to be presented via the optical combiner only, generating yet another light field image to be displayed via the light field display unit, based on the relative location of the first eye and the second eye of the at least one user with respect to the optical combiner, and a position and an orientation of at least a region of the light-emitting component of the light field display unit with respect to the optical combiner, wherein at least said region of the light-emitting component is to be employed to present the virtual content;

displaying the yet another light field image via the light field display unit to produce yet another synthetic light field; and controlling an active optical element, based on the relative location of the first eye and the second eye of the at least one user with respect to the optical combiner, and the position and the orientation of at least said region of the light-emitting component with respect to the optical combiner, to re-direct the yet another synthetic light field towards the optical combiner, wherein the active optical element is arranged on an optical path of the light-emitting component, wherein the optical combiner is employed to reflect respective parts of the yet another synthetic light field towards the first eye and the second eye of the at least one user, while optically combining the real-world light field with the respective parts of the yet another synthetic light field.

19. The method of claim 14, further comprising:

generating a first light field image to be displayed via the light field display unit, based on a position and an orientation of the light-emitting component of the light field display unit with respect to the first eye and the second eye of the at least one user;

generating a second light field image to be displayed via the light field display unit, based on the relative location of the first eye and the second eye of the at least one user with respect to the optical combiner, and a position and an orientation of the light-emitting component of the light field display unit with respect to the optical combiner;

displaying the first light field image and the second light field image, via the light field display unit, to produce a first synthetic light field and a second synthetic light field, respectively, wherein the first light field image and the second light field image are displayed by employing temporal multiplexing;

when displaying the first light field image, controlling an active optical element, based on the position and the orientation of the light-emitting component with respect to the first eye and the second eye of the at least one user, to re-direct respective parts of the first synthetic light field towards the first eye and the second eye of the at least one user, wherein the active optical element is arranged on an optical path of the light-emitting component; and when displaying the second light field image, controlling the active optical element, based on the relative location of the first eye and the second eye of the at least one user with respect to the optical combiner, and the position and the orientation of the light-emitting component with respect to the optical combiner, to re-direct the second synthetic light field towards the optical combiner, wherein the optical combiner is employed to reflect respective parts of the second synthetic light field towards the first eye and the second eye of the at least one user, while optically combining the real-world light field with the respective parts of the second synthetic light field.

20. The method of claim 14, wherein at least a first sub-region of the first region of the given light field image and at least a second sub-region of the second region of the given light field image are generated based on same virtual content, wherein the first sub-region of the first region is adjacent to the second sub-region of the second region.

* * * * *